US012470008B2

(12) United States Patent
Kuo

(10) Patent No.: US 12,470,008 B2
(45) Date of Patent: Nov. 11, 2025

(54) STRUCTURE OF COMMUNICATION CONNECTOR WITH CUSHION

(71) Applicant: Sheng Hsien Kuo, Taipei (TW)

(72) Inventor: Sheng Hsien Kuo, Taipei (TW)

( * ) Notice: Subject to any disclaimer, the term of this patent is extended or adjusted under 35 U.S.C. 154(b) by 294 days.

(21) Appl. No.: 18/363,219

(22) Filed: Aug. 1, 2023

(65) Prior Publication Data

US 2024/0243507 A1 Jul. 18, 2024

(30) Foreign Application Priority Data

Jan. 18, 2023 (TW) ................................ 112200670

(51) Int. Cl.
*H01R 13/436* (2006.01)
*H01R 13/02* (2006.01)
*H01R 13/627* (2006.01)

(52) U.S. Cl.
CPC ....... *H01R 13/4364* (2013.01); *H01R 13/025* (2013.01); *H01R 13/6272* (2013.01)

(58) Field of Classification Search
CPC .............. H01R 13/4364; H01R 13/025; H01R 13/6272; H01R 4/2407; H01R 4/2404
USPC .................................................. 439/595, 418
See application file for complete search history.

(56) References Cited

U.S. PATENT DOCUMENTS 6,592,397 B2 * 7/2003 Pocrass .................. H01R 27/00 439/418
6,932,641 B1 * 8/2005 Liao ....................... H01R 13/58 439/418
8,992,260 B2 * 3/2015 Coffey ................... H01R 24/64 439/620.22
9,595,797 B2 * 3/2017 Taylor .................... H01R 43/24
2003/0096529 A1 * 5/2003 Brennan ............ H01R 13/6461 439/418
2004/0259411 A1 * 12/2004 Chen .................. H01R 13/6477 439/418

(Continued)

*Primary Examiner* — Gary F Paumen
(74) *Attorney, Agent, or Firm* — Muncy, Geissler, Olds & Lowe, P.C.

(57) ABSTRACT

The present disclosure provides an improved structure of communication connector with cushion, including a body, electrically conductive terminals, an elastic locking tab, a wire-accommodating space, at least one cushion part and at least one abutting part. The body has an accommodating space, and the accommodating space has an opening. The electrically conductive terminals are disposed side by side on one side of the body, and each of the electrically conductive terminals extends into the accommodating space. The elastic locking tab is disposed on another side of the body opposite to the electrically conductive terminals. The wire-accommodating space communicates with the accommodating space, and an opening of the wire-accommodating space is disposed at the other end of the body. The at least one cushion part is disposed on the other end of the body. A position where the at least one cushion part is disposed is between the wire-accommodating space and the elastic locking tab. The at least one abutting part is disposed on the other end of the body. A position where the at least one abutting part is disposed is adjacent to the second opening. Through the above, after the twisted wires in the transmission line are arranged to be crimped, the excess twisted wires can be cut off evenly.

10 Claims, 6 Drawing Sheets

(56) References Cited

U.S. PATENT DOCUMENTS

| | | | | |
|---|---|---|---|---|
| 2005/0153603 | A1* | 7/2005 | AbuGhazaleh .... | H01R 13/6463 439/676 |
| 2012/0088412 | A1* | 4/2012 | Mattson ................. | H01R 29/00 439/660 |
| 2012/0302103 | A1* | 11/2012 | Su ......................... | G02B 6/3817 439/660 |
| 2015/0270662 | A1* | 9/2015 | Taylor .............. | H01R 13/62933 29/841 |
| 2016/0285181 | A1* | 9/2016 | Courchaine ............ | H01R 24/64 |
| 2017/0302040 | A1* | 10/2017 | Taylor .................. | H01R 13/665 |

* cited by examiner

STRUCTURE OF COMMUNICATION CONNECTOR WITH CUSHION

BACKGROUND OF INVENTION

Field of the Present Disclosure

The present disclosure relates to a communication connector with a cushion that allows a cutter to conveniently cut twisted wires evenly.

Brief Description of Related Art

Twisted wires are a type of data transmission line composed of four pairs of transmission lines of different colors and are widely used in Ethernet and telephone lines. Ends of the twisted wires are often connected to a communication connector for insertion into a compatible port. The communication connector is a connector commonly used when an Ethernet or telephone network uses the twisted wires for connection.

A line connection end structure of a conventional communication connector is like a hollow base body. When the line connection end structure of the conventional communication connector and the twisted wires are assembled, the twisted wires pass through the line connection end structure of the communication connector, and a blade is used to evenly cut a part of the twisted wires which exceeds the line connection end structure of the communication connector. However, the twisted wires are often not cut evenly, which affects an electrical connection between an electrically conductive terminal and the transmission line, thereby affecting transmission performance of the twisted wires.

Thus, how to design a communication connector with a cushion that allows the twisted wires to be conveniently cut evenly has become a common goal for relevant manufacturers and research and development personnel.

SUMMARY OF INVENTION

In view of the deficiency that the conventional structure is prone to uneven cutting of the transmission lines, thereby affecting transmission performance of the twisted wires, the inventor actively developed an improvement for the aforementioned shortcoming.

An object of the present disclosure is to provide an improved structure of a communication connector with a cushion which allows excess twisted wires in a transmission line to be conveniently cut off evenly after the communication connector is assembled and crimped.

In order to achieve the aforementioned object, an improved structure of a communication connector with a cushion according to the present disclosure includes a body, a plurality of electrically conductive terminals, an elastic locking tab, a wire-accommodating space, at least one cushion part, and at least one abutting part. The body has an accommodating space. The accommodating space has a first opening. The first opening is disposed at one end of the body. The electrically conductive terminals are disposed side by side on one side of the body and in proximity to the other end of the body. Each of the electrically conductive terminals extends into the accommodating space. The elastic locking tab is disposed on another side of the body opposite to the electrically conductive terminals. The wire-accommodating space has a second opening. The second opening is disposed at the other end of the body and the wire-accommodating space communicates with the accommodating space. The at least one cushion part is disposed on the other end of the body. A position where the at least one cushion part is disposed is between the wire-accommodating space and the elastic locking tab. The at least one abutting part is disposed on the other end of the body. A position where the at least one abutting part is disposed is adjacent to the second opening, and a first extending direction of the at least one abutting part and a second extending direction of the at least one cushion part are perpendicular to each other.

In an embodiment, further, the second opening has a first length and the at least one cushion part has a second length. The second length is greater than the first length.

In an embodiment, further, the improved structure of the communication connector with the cushion includes two abutting parts, the two abutting parts are respectively disposed at two ends adjacent to the second opening so that there is a first distance between the two abutting parts, and the first distance is greater than the first length.

In an embodiment, further, the improved structure of the communication connector with the cushion includes two cushion parts. There is spacing between the two cushion parts, and the two cushion parts have the second length in the second extending direction.

In an embodiment, a transmission line is assembled in the improved structure of the communication connector with the cushion, a plurality of twisted wires in the transmission line are separated and arranged corresponding to the wire-accommodating space, and the twisted wires are cut evenly with a blade by using the at least one cushion part as at least one cutting cushion for the blade, assisted by the at least one abutting part that is abutted against by the blade.

In an embodiment, further, each of the electrically conductive terminals is a metal sheet.

In an embodiment, further, an end of each of the electrically conductive terminals in the accommodating space has a plurality of tip parts.

In an embodiment, further, two ends of the at least one cushion part are respectively connected to the at least one abutting part, and the at least one cushion part and the at least one abutting part are integrally formed.

In an embodiment, further, the at least one cushion part extends beyond the other end of the body by a first height, and the at least one abutting part extends beyond the other end of the body by a second height. The first height is greater than or equal to the second height.

In an embodiment, further, the at least one cushion part extends beyond the other end of the body by a first height, and the at least one abutting part extends beyond the other end of the body by a second height. The first height is less than the second height.

DETAILED DESCRIPTION OF PREFERRED EMBODIMENTS

The description of the embodiments with reference to the accompanying drawings below is exemplary, aims at illustrating the present disclosure, and cannot be considered as limitations to the present disclosure.

Figure 1:
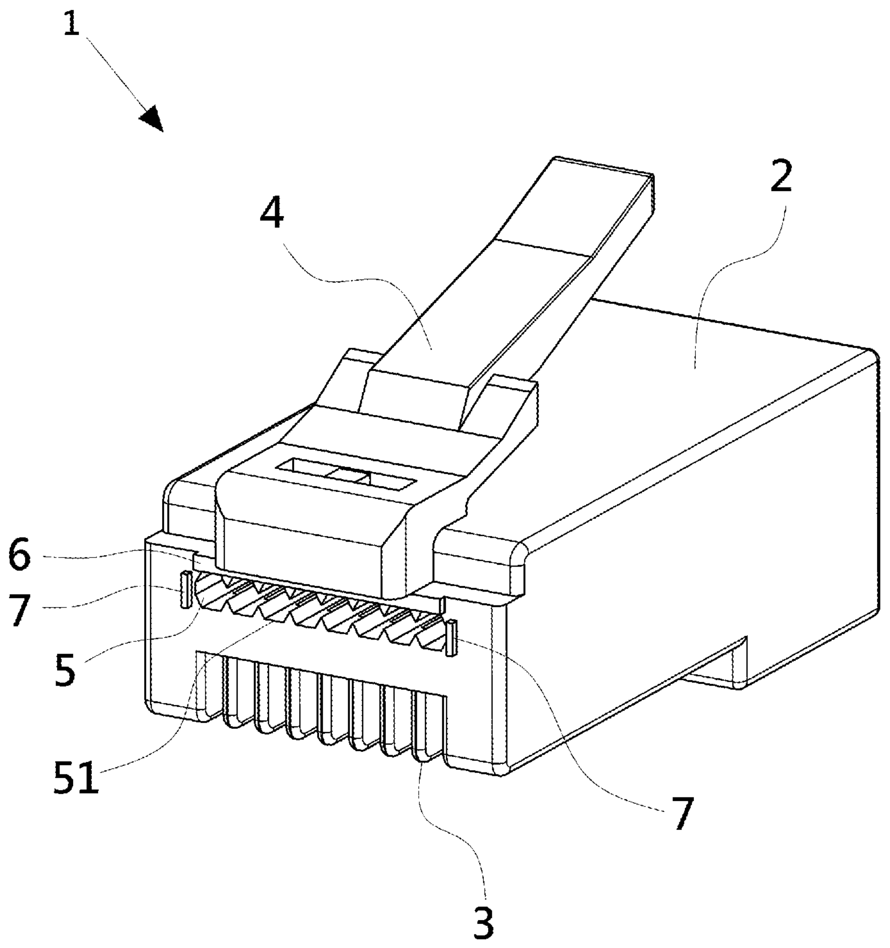
FIG. 1 is a schematic perspective view of the present disclosure.
Figure 2:
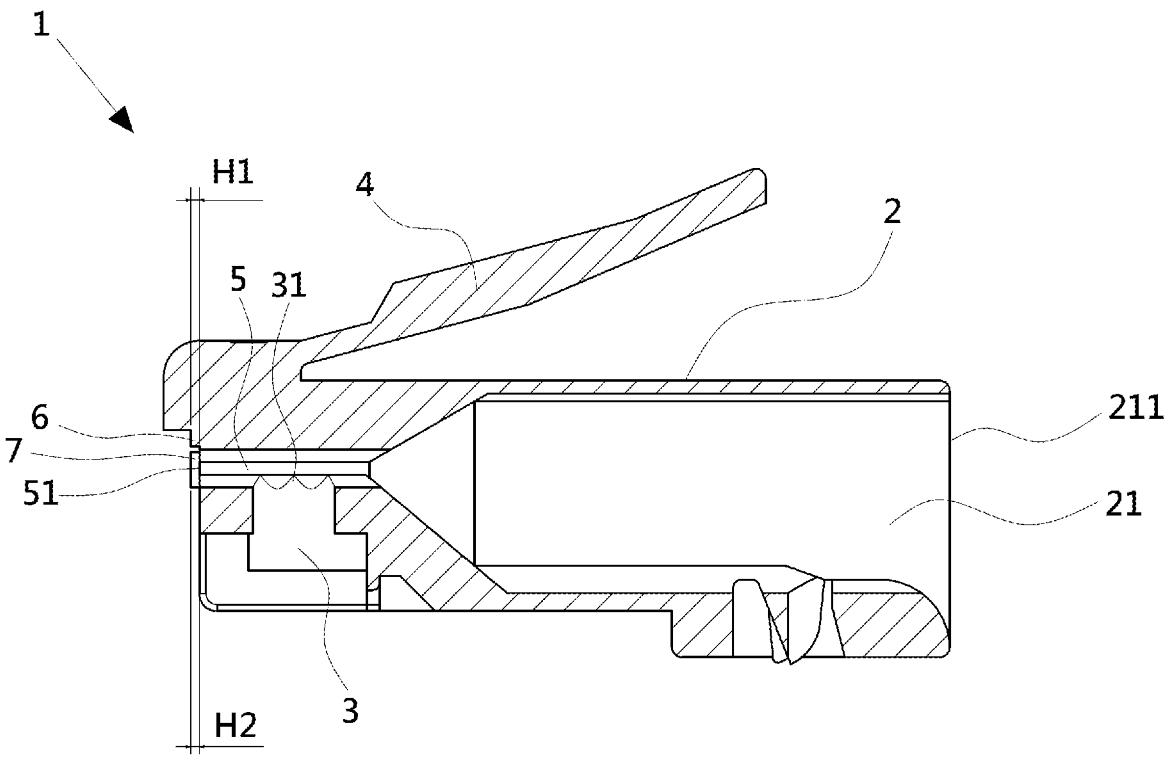
FIG. 2 is a schematic cross-sectional view of the present disclosure.
Figure 3:
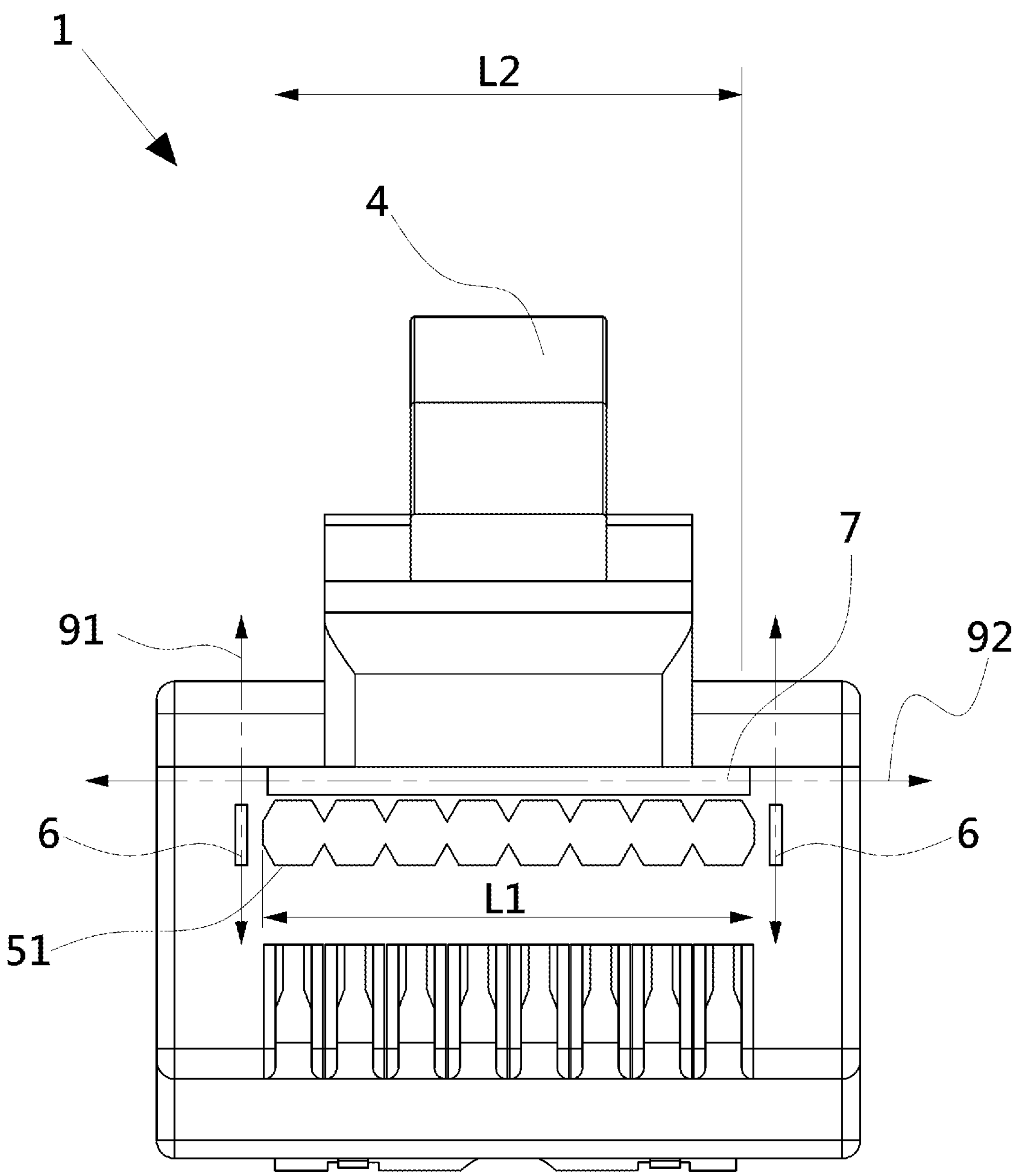
FIG. 3 is a front view of the present disclosure.

Referring to FIGS. 1 to 3, an improved structure of a communication connector with a cushion 1 according to the present disclosure includes a body 2, a plurality of electrically conductive terminals 3, an elastic locking tab 4, a wire-accommodating space 5, at least one cushion part 6, and at least one abutting part 7.

The body 2 has an accommodating space 21. The accommodating space 21 has a first opening 211. The first opening 211 is disposed at one end of the body 2.

The electrically conductive terminals 3 are disposed side by side on one side of the body 2 and in proximity to the other end of the body 2. Each of the electrically conductive terminals 3 extends into the accommodating space 21. In addition, in the present embodiment, each of the electrically conductive terminals 3 is a metal sheet. An end of each of the electrically conductive terminals 3 in the accommodating space 21 has a plurality of tip parts 31. But the present disclosure is not limited thereto.

The elastic locking tab 4 is disposed on another side of the body 2 opposite to the electrically conductive terminals 3.

The wire-accommodating space 5 has a second opening 51. The second opening 51 is disposed at the other end of the body 2 and the wire-accommodating space 5 communicates with the accommodating space 21. The second opening 51 has a first length L1.

The at least one cushion part 6 is disposed on the other end of the body 2. A position where the at least one cushion part 6 is disposed is between the wire-accommodating space 5 and the elastic locking tab 4. The at least one cushion part 6 has a second length L2. The second length L2 is greater than the first length L1.

The at least one abutting part 7 is disposed on the other end of the body 2. A position where the at least one abutting part 7 is disposed is adjacent to the second opening 51, and a first extending direction 91 of the at least one abutting part 7 and a second extending direction 92 of the at least one cushion part 6 are perpendicular to each other.

When a transmission line is assembled in the improved structure of the communication connector with the cushion 1, a plurality of twisted wires in the transmission line are separated and arranged corresponding to the wire-accommodating space 5. After a crimping operation is performed, the twisted wires are cut evenly with a blade by using the at least one cushion part 6 as at least one cutting cushion for the blade, assisted by the at least one abutting part 7 that is abutted against by the blade.

Furthermore, the at least one cushion part 6 extends beyond the other end of the body 2 by a first height H1, and the at least one abutting part 7 extends beyond the other end of the body 2 by a second height H2. And the first height H1 and the second height H2 can be the same or different. For example, the first height H1 is greater than the second height H2, the first height H1 is equal to the second height H2, or the first height H1 is less than the second height H2.

Figure 4:
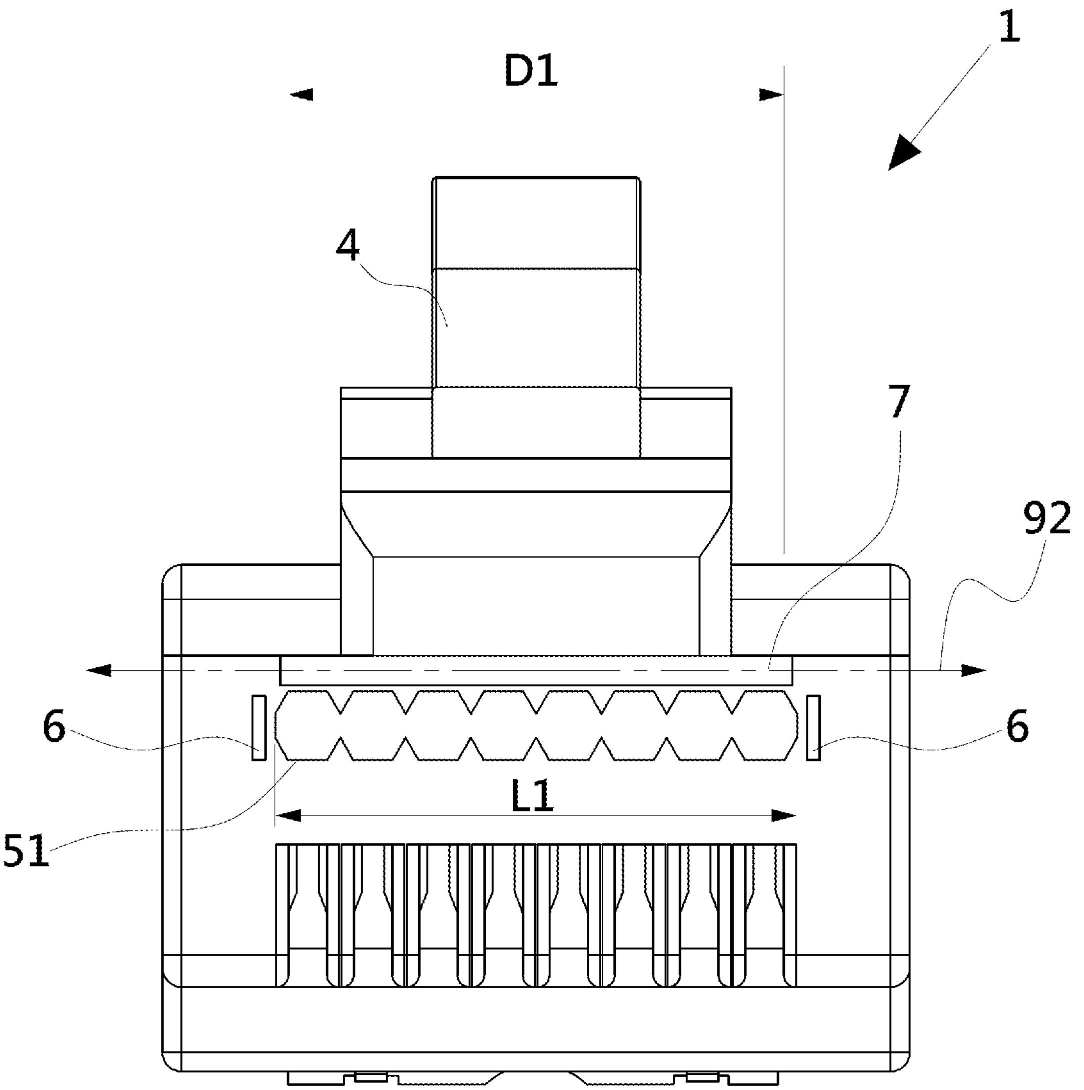
FIG. 4 is a front view of another embodiment of the present disclosure.

Referring to FIG. 4, in another embodiment, the improved structure of the communication connector with the cushion 1 includes two abutting parts 6, the two abutting parts 6 are respectively disposed at two ends adjacent to the second opening 51 so that there is a first distance D1 between the two abutting parts 6, and the first distance D1 is greater than the first length L1.

Figure 5:
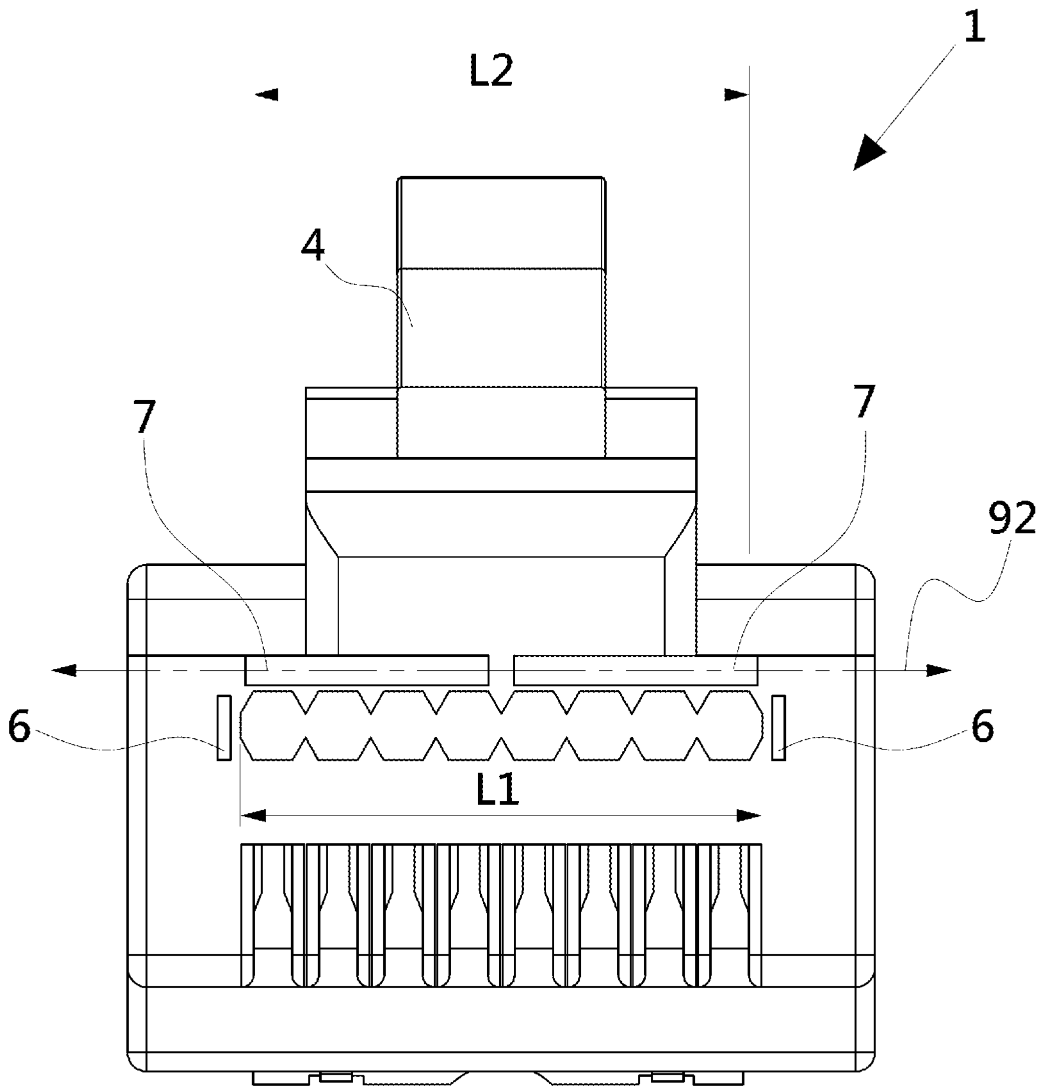
FIG. 5 is a front view of still another embodiment of the present disclosure.

Referring to FIG. 5, in this embodiment, the improved structure of the communication connector with the cushion 1 includes two cushion parts 7. There is spacing between the two cushion parts 7, and the two cushion parts 7 have the second length L2 in the second extending direction 92.

Figure 6:
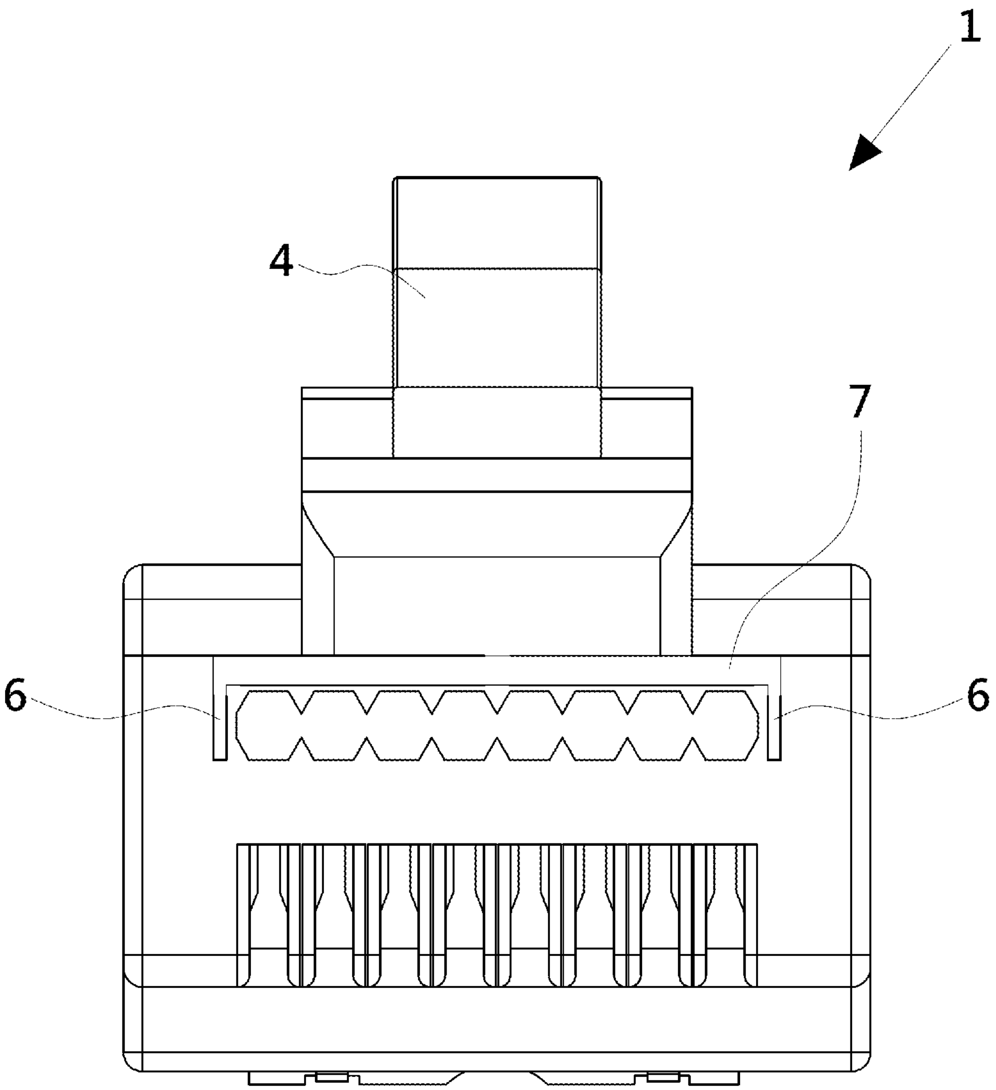
FIG. 6 is a front view of yet another embodiment of the present disclosure.

Referring to FIG. 6, in this embodiment, two ends of the at least one cushion part 7 are respectively connected to the at least one abutting part 6, and the at least one cushion part 7 and the at least one abutting part 6 are integrally formed.

As mentioned above, advantages of the present disclosure are as follows:

Through the above structure, when a transmission line is assembled, a plurality of twisted wires in the transmission line are first separated and arranged passing through an accommodating space so that a crimping process can be performed. A part of the twisted wires which exceeds a second opening is cut evenly with a blade. The twisted wires are cut evenly by using at least one cushion part as at least one cushion for the blade, and at the same time, allowing the blade to abut against the at least one abutting part, thereby maintaining transmission performance of the transmission line.

Based on the above, it can be seen that the methods and devices disclosed by the present disclosure can be implemented in other ways. For example, the device embodiments described above are merely illustrative, and are optional implementations of the present disclosure. Persons skilled in the art can carry out many changes and modifications without departing from the principles of the present disclosure. These changes and modifications should be included in the protection scope of the present disclosure.

REFERENCE SIGN

- 1 an improved structure of a communication connector with a cushion
- 2 a body
- 21 an accommodating space
- 211 a first opening
- 3 electrically conductive terminals
- 31 tip parts
- 4 an elastic locking tab
- 5 a wire-accommodating space
- 51 a second opening
- 6 at least one cushion part
- 7 at least one abutting part
- 91 a first extending direction
- 92 a second extending direction
- D1 a first distance
- H1 a first height
- H2 a second height
- L1 a first length
- L2 a second length

What is claimed is:

1. An improved structure of a communication connector with a cushion, comprising:

a body having an accommodating space, the accommodating space having a first opening, the first opening being disposed at one end of the body;

a plurality of electrically conductive terminals disposed side by side on one side of the body and in proximity to the other end of the body, each of the electrically conductive terminals extending into the accommodating space;

an elastic locking tab disposed on another side of the body opposite to the electrically conductive terminals;

a wire-accommodating space having a second opening, the second opening being disposed at the other end of the body and the wire-accommodating space communicating with the accommodating space;

at least one cushion part disposed on the other end of the body, a position where the at least one cushion part is disposed being between the wire-accommodating space and the elastic locking tab; and at least one abutting part disposed on the other end of the body, a position where the at least one abutting part is disposed being adjacent to the second opening, and a first extending direction of the at least one abutting part and a second extending direction of the at least one cushion part being perpendicular to each other.

2. The improved structure of the communication connector with the cushion of claim 1, wherein the second opening has a first length and the at least one cushion part has a second length, the second length being greater than the first length.

3. The improved structure of the communication connector with the cushion of claim 2, wherein the improved structure of the communication connector with the cushion comprises two abutting parts, the two abutting parts being respectively disposed at two ends adjacent to the second opening so that there is a first distance between the two abutting parts, and the first distance is greater than the first length.

4. The improved structure of the communication connector with the cushion of claim 2, wherein the improved structure of the communication connector with the cushion comprises two cushion parts, there being spacing between the two cushion parts, and the two cushion parts have the second length in the second extending direction.

5. The improved structure of the communication connector with the cushion of claim 1, wherein a transmission line is assembled in the improved structure of the communication connector with the cushion, a plurality of twisted wires in the transmission line being separated and arranged corresponding to the wire-accommodating space, and the twisted wires being cut evenly with a blade by using the at least one cushion part as at least one cutting cushion for the blade, assisted by the at least one abutting part that is abutted against by the blade.

6. The improved structure of the communication connector with the cushion of claim 1, wherein each of the electrically conductive terminals is a metal sheet.

7. The improved structure of the communication connector with the cushion of claim 6, wherein an end of each of the electrically conductive terminals in the accommodating space has a plurality of tip parts.

8. The improved structure of the communication connector with the cushion of claim 1, wherein two ends of the at least one cushion part are respectively connected to the at least one abutting part, and the at least one cushion part and the at least one abutting part are integrally formed.

9. The improved structure of the communication connector with the cushion of claim 1, wherein the at least one cushion part extends beyond the other end of the body by a first height, and the at least one abutting part extends beyond the other end of the body by a second height, the first height being greater than or equal to the second height.

10. The improved structure of the communication connector with the cushion of claim 1, wherein the at least one cushion part extends beyond the other end of the body by a first height, and the at least one abutting part extends beyond the other end of the body by a second height, the first height being less than the second height.

* * * * *